UNITED STATES PATENT OFFICE.

EDGAR F. PRICE, OF NIAGARA FALLS, NEW YORK.

LIME PRODUCT.

No. 866,599.  Specification of Letters Patent.  Patented Sept. 17, 1907.

Application filed December 29, 1906. Serial No. 350,066.

*To all whom it may concern:*

Be it known that I, EDGAR F. PRICE, a citizen of the United States, residing at Niagara Falls, in the county of Niagara and State of New York, have invented certain new and useful Improvements in Lime Product, of which the following is a specification.

The quick-lime delivered from calcining kilns normally contains a considerable amount of what is termed "overburnt lime", a product which is highly-shrunk or fritted, dense, hard and extremely resistant to hydration or slaking by water. If mortar or plaster be made from lime containing these overburnt portions, after such mortar or plaster has been used and has set, the slow slacking of the contained particles of overburnt lime by the moisture of the atmosphere, with the consequent increase in volume due to hydration, causes defects or fractures which seriously impair the strength and appearance of the material. For this reason the overburnt lime is usually separated from the commercial lime and thrown aside, or sold to farmers for application to agricultural land.

I have found that when overburnt lime is ground or otherwise converted into an impalpable powder, the powder readily absorbs water, or hydrates, so that it is fitted for immediate use and has substantially the same value as the best commercial lime. This is presumably due to the fact that the dense, highly-shrunk or silicious coating of the particles is abraded, broken or removed by grinding, so as to expose ultimate portions which are in such physical condition as to readily absorb water. The ground lime, however, is rapidly deteriorated by the action of damp air, so that for storage, transportation or subsequent use, it is desirable to pack it in containers which will exclude air and moisture. Such ground overburnt lime, especially in sealed air and moisture-proof packages, is believed to constitute a new and valuable article of manufacture, utilizing what has heretofore been substantially a waste product. When properly packaged, preferably in sheet-steel drums, it may be kept for long periods and transported to any desired point without undergoing deterioration.

I claim:

As a new article of manufacture, overburnt quick-lime, in the form of a powder, the minute particles of which are in such physical condition as to readily absorb water.

In testimony whereof, I affix my signature in presence of two witnesses.

EDGAR F. PRICE.

Witnesses:
E. STEIN,
EUGENE A. BYRNES.